(12) United States Patent
ter Maat et al.

(10) Patent No.: US 8,674,018 B2
(45) Date of Patent: Mar. 18, 2014

(54) BINDER AND PROCESS FOR PRODUCING METALLIC OR CERAMIC MOLDINGS IN POWDER INJECTION MOLDING

(75) Inventors: Johan ter Maat, Mannheim (DE); Martin Blömacher, Meckenheim (DE); Hans Wohlfromm, Mannheim (DE); Mario Nohe, Heuchelheim (DE); Robert Loos, Ludwigshafen (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/606,523

(22) Filed: Sep. 7, 2012

(65) Prior Publication Data

US 2013/0062820 A1   Mar. 14, 2013

Related U.S. Application Data

(60) Provisional application No. 61/531,634, filed on Sep. 7, 2011.

(51) Int. Cl.
*C08L 59/00*   (2006.01)

(52) U.S. Cl.
USPC .......................................... 524/593; 264/670

(58) Field of Classification Search
USPC .......................................... 524/593; 264/670
See application file for complete search history.

(56) References Cited

U.S. PATENT DOCUMENTS

| | | |
|---|---|---|
| 4,197,118 A | 4/1980 | Wiech, Jr. |
| 5,080,846 A | 1/1992 | Kim et al. |
| 5,145,900 A | 9/1992 | Sterzel et al. |
| 5,198,489 A | 3/1993 | Sterzel et al. |
| 5,362,791 A | 11/1994 | Ebenhoech et al. |
| 5,611,978 A | 3/1997 | Truebenbach |
| 6,051,184 A | 4/2000 | Kankawa |
| 2003/0091456 A1 | 5/2003 | Bloemacher et al. |
| 2008/0075620 A1 | 3/2008 | Sakata et al. |
| 2008/0226489 A1 | 9/2008 | Sakata et al. |
| 2008/0227906 A1 | 9/2008 | Sakata et al. |
| 2009/0288739 A1 | 11/2009 | Wohlfromm et al. |

FOREIGN PATENT DOCUMENTS

| | | |
|---|---|---|
| DE | 4337129 A1 | 8/1994 |
| DE | 19925197 A1 | 12/1999 |
| DE | 10019447 A1 | 10/2001 |
| EP | 0413231 A2 | 2/1991 |
| EP | 0444475 A2 | 9/1991 |
| EP | 0446708 A2 | 9/1991 |
| EP | 465940 A2 | 1/1992 |
| EP | 501602 A2 | 9/1992 |
| JP | 2002069145 A | 3/2002 |
| WO | WO-91/07364 A1 | 5/1991 |
| WO | WO-94/25205 A1 | 11/1994 |
| WO | WO-2008/006776 A1 | 1/2008 |
| WO | WO-2011016718 A1 | 2/2011 |

OTHER PUBLICATIONS

Kankawa, Yoshimitsu, et al., "Injection Molding of SUS316L Powder with Polyacetal Polyethylene Polymer-Alloy Polymer", J. of the Japan Soc. of Powder Metallurgy, vol. 43, No. 7, (1996), pp. 840-845.
International Search Report for PCT/IB2012/054603, mailing date Jan. 24, 2013.

*Primary Examiner* — Peter Szekely
(74) *Attorney, Agent, or Firm* — Novak Druce Connolly Bove + Quigg LLP

(57) ABSTRACT

The invention relates to binders for pulverulent metals, metal alloys or ceramics based on polyacetals, polyethers and polyesters, to thermoplastic compositions comprising these binders for the production of metallic or ceramic moldings, to the use thereof and to processes for production of moldings therefrom.

6 Claims, 1 Drawing Sheet

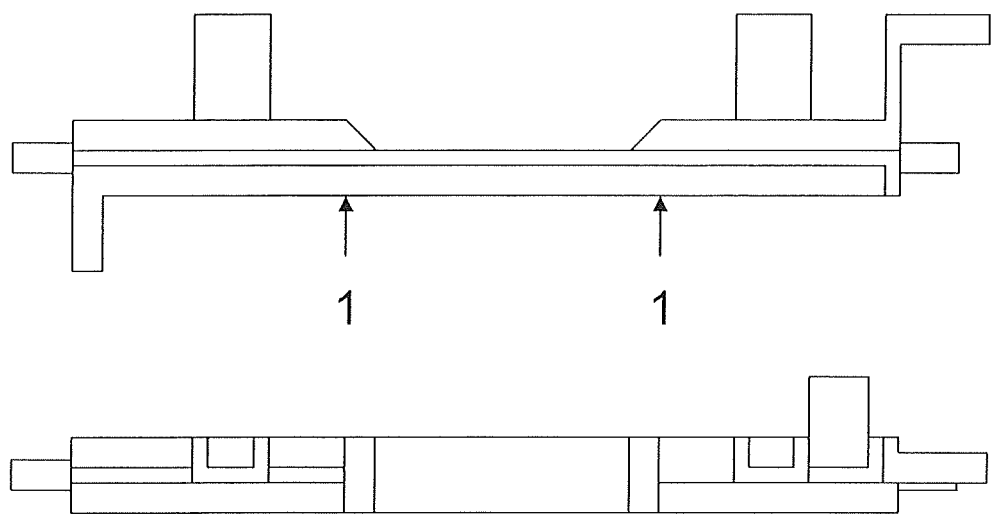

BINDER AND PROCESS FOR PRODUCING METALLIC OR CERAMIC MOLDINGS IN POWDER INJECTION MOLDING

CROSS-REFERENCE TO RELATED APPLICATIONS

This application claims benefit (under 35 USC 119(e)) of U.S. Provisional Application 61/531,634, filed Sep. 7, 2011, which is incorporated by reference.

The present invention relates to binders for pulverulent metals or pulverulent metal alloys or pulverulent ceramics based on polyacetals, polyethers and polyesters, to thermoplastic compositions comprising these binders for the production of metallic or ceramic moldings, to the use thereof and to processes for production of moldings therefrom.

Metallic or ceramic moldings can be produced by injection molding, extrusion or compression molding of thermoplastic compositions which, in addition to metal powders and/or ceramic powders, comprise an organic binder. These are organic polymer molding compositions with a high filler level.

After the thermoplastic composition has been shaped to give a green part, the organic binder is partly removed in a primary debinding and the resulting debound green part (=brown part) is treated further.

The brown part still comprises a binder component which is not removed in the primary debinding. This residual binder is intended to hold the powder particles together in the molding and is typically driven out by thermal decomposition.

The fully debound brown part now obtained (=white part) is sintered. Often, but not always, the thermal decomposition of the residual binder is integrated into the sintering cycle.

The first binders for the powder injection molding process were based generally on mixtures of polyethylene or polypropylene and wax. In this case, the green body is first freed of the wax by melting and the residual binder is burnt out by slow pyrolysis. For the melting, the green parts have to be introduced into a powder bed because there is virtually no green strength as a result of the melting. Later binder systems for thermal debinding do not involve melting because the costly and inconvenient embedding of the green parts into powder and subsequent excavation are much too time-consuming.

Typically, an improved binder system for the complete thermal debinding consists of several components, for example of polyoxymethylene (POM), polypropylene, waxes and resins, as described in DE 199 25 197. These components are released gradually from the shaped bodies on heating at different temperatures, such that the typically relatively low binder constituent is still present up to at least 400° C. and can be considered to be residual binder. Purely thermal debinding takes 1 to 3 days and is thus extremely slow.

A still further-improved process is that of solvent debinding, in which binder systems which comprise binder components of different solubility are used. For debinding of the green part, one binder component is first removed by solvent extraction, after which the remaining residual binder component, which is insoluble or very sparingly soluble in the solvent, is in turn removed from the molding by a slow thermal decomposition (e.g. U.S. Pat. No. 4,197,118 or EP 501 602). In the course of this, the melting range of the residual binder is passed through and plastic deformation of the powder molding is unavoidable as a result.

WO 2011/016718 A1 describes a process for production of metallic or ceramic moldings, in which a molding composition is formed from a metallic or ceramic sinter powder with a binder mixture composed of a polymer, for example polyoxymethylene (POM or else polyacetal) and a nonpolymeric solvent for the polymer (molar mass <300 g/mol, melting point >RT). The binder preferably comprises in each case at least 5% by weight of the polymer and of the nonpolymeric solvent. The nonpolymeric solvent is vaporized (e.g. at 69 to 130° C.) or can be leached out of the molding composition with a further solvent or diluted. The remaining polymer is removed by a thermal debinding, preferably above 200° C. In the examples with a metal powder, POM as binder component alongside caprolactam (proportions by weight 50:50), the 2-stage thermal debinding is disclosed with a vaporization at 69 to 130° C. and a thermal debinding 240° C.

It is disadvantageous in this process that such binders, when mixed with the sinter powder and in the course of processing on an injection molding machine, already vaporize the nonpolymeric solvent. The low molecular weight component is sweated out at the green part surface and soils the injection mold. Furthermore, the green part strength is distinctly reduced.

Complete thermal binder removal is also described with polyoxymethylene binders using the example of ceramic powders at temperatures of 160 to 220° C. in the presence of air, or at 300 to 360° C. in the presence of nitrogen (U.S. Pat. No. 5,080,846 A and WO 91/07364 A1).

Y. Kankawa (Journal of the Japan Society of Powder Metallurgy 43/7 (1996) 840-845) reports studies of thermal debinding in air of a metal powder (SUS316L) with polyacetal, among other substances, as the binder component at 300 to 320° C.

As already detailed above, purely thermal binder removal is very slow and deformation of the moldings occurs very frequently since the temperatures in the thermal debinding (>200° C.) of the metallic molding compositions are within a temperature range well above the melting range of polyacetal (160 to 170° C.).

Furthermore, thermal debinding in an oxygenous atmosphere constitutes a problem in the case of use of metal powders, in contrast to ceramic powders, because the powder surface is generally oxidized in the process and hence the quality and integrity of the sintered molding are impaired.

A further process for debinding the green part according to the prior art is based on catalytic debinding by treatment of the green part in a gaseous, acid-containing atmosphere at elevated temperature. Molding compositions for the catalytic debinding need even less residual binder. In general, the residual binder content is around 10%, the remainder consisting typically of polyacetal.

EP-A 0 413 231 discloses, for example, a process for producing an inorganic sintered molding, in which a mixture of a sinterable inorganic powder and polyoxymethylene as a binder is shaped to a green body, and the binder is then removed by treating the green body in a gaseous, acid-containing, for example boron trifluoride- or $HNO_3$-comprising, atmosphere. Subsequently, the green body thus treated is sintered. Examples of sinterable powders are both oxidic ceramic powders such as $Al_2O_3$, $ZrO_2$, $Y_2O_3$, and nonoxidic ceramic powders such as SiC, $Si_3N_4$ and metal powders.

With a binder phase consisting exclusively of POM, however, satisfactory results are not obtained in practice since the brown part strength is entirely unsatisfactory and the sinter densities are too low.

EP-A 0 444 475 describes binder compositions which are suitable for ceramic shaped bodies and comprise, in addition to polyoxymethylene, as an additional soluble polymer, poly-1,3-dioxolane, poly-1,3-dioxane or poly-1,3-dioxepane, or, as a polymer dispersible in polyoxymethylene, aliphatic polyurethanes, aliphatic polyepoxides, poly($C_2$-$C_6$-alkylene oxides), aliphatic polyamides or polyacrylates, or mixtures thereof.

EP 0 465 940 A1 and DE 100 19 447 A1 describe thermoplastic molding compositions for the production of metallic shaped bodies, which comprise, in addition to a sinterable pulverulent metal or a pulverulent metal alloy, a mixture of polyoxymethylene homo- or copolymers and a polymer immiscible therewith as a binder. Useful additional polymers include polyolefins, especially polyethylene and polypropylene, and also polymers of methacrylic esters such as PMMA (EP 0 465 940 A1). DE 100 19 447 A1 describes binders for inorganic material powders for production of metallic and ceramic shaped bodies, these binders comprising a mixture of polyoxymethylene homo- or copolymers and a polymer system composed of polytetrahydrofuran and at least one polymer formed from $C_{2-8}$-olefins, vinylaromatic monomers, vinyl esters of aliphatic $C_{1-8}$-carboxylic acids, vinyl $C_{1-8}$-alkyl ethers or $C_{1-12}$-alkyl(meth)acrylates.

WO 2008/006776 A1 describes binders for inorganic material powders for production of metallic shaped bodies, these binders being a mixture of polyoxymethylene homo- or copolymers and a polymer system formed from $C_{2-8}$-olefins and poly-1,3-dioxepane or poly-1,3-dioxolane.

When the aforementioned polyoxymethylene binder systems are used, the green parts are debinded catalytically by treatment of the green part in a gaseous, acid-containing atmosphere of, for example, hydrogen halides, formic acid or nitric acid at elevated temperature. This depolymerizes the polyoxymethylene homo- or copolymers without residue, followed by a thermal residual debinding of the remaining polymer. Here too, the melting range of the residual binder is passed through and a certain level of plastic deformation of the powder molding is unavoidable as a result. The residual binder content after the catalytic removal of the first binder is generally about 10% and is thus lower than after a solvent debinding of the first binder, in which the residual binder content is typically 30 to 70%. A lower residual binder content has the advantage that the plastic deformation of the molding is typically less pronounced.

Catalytic debinding of moldings with oxalic acid is described in WO 94/25205. However, catalytic debinding with oxalic acid in direct comparison with $HNO_3$ is much slower, and the metered addition of oxalic acid in solid form is problematic, and so there has been no industrial use thereof to date.

US 2008/0075620 A1 describes catalytic debinding of a molding obtained by powder injection molding with ozone to remove polyethers, polylactides and/or aliphatic polycarbonates as the first binder component. Polyether components based on polyacetal are preferred. The binder phase may also comprise a second binder with a higher thermal decomposition temperature than the first binder component, which is removed in a subsequent debinding step. The second binder is preferably polystyrene and/or a polyolefin. The proportion of the first component in the binder phase is 20% by weight or more. Mixtures of binders comprising polyethers or polyacetals and polyesters are not described in any greater detail.

US 2008/0227906 A1 describes the catalytic debinding of moldings obtained by powder injection molding with an alkaline gas, for example ammonia, to remove a first binder component which is preferably based on aliphatic polyesters and/or polyethers. Preference is given to polyesters, especially polycarbonates and polyhydroxy acids such as polyglycolide and polylactide. The binder phase may comprise a second binder which has a higher decomposition temperature than the first binder and is removed in a later debinding step at higher temperature. The second (residual) binder is preferably polystyrene and/or a polyolefin. The proportion of the first binder in the binder phase is 20% by weight or more. Mixtures of binders comprising polyethers and polyesters are not described in any greater detail.

A further debinding process for removal of polycarbonates with an alkaline gas is described in US 2008/0226489 A1.

According to the prior art, the residual binder is removed by thermal decomposition without exception. The temperature which is required for removal of the residual binder from the molding depends on the polymer selected and on the selection of the furnace protective gas, but is typically within the temperature range from 300 to 600° C., especially 400 to 500° C.

The residual debinding can take place separately in a furnace installed specially for that purpose, especially when the residual binder content is 30% by weight or more. This has the advantage that the sinter furnace cannot be contaminated with pyrolysed organic substances, which collect preferentially at colder sites and have to be removed regularly by cleaning operations. Moreover, without pyrolysis of the residual binder in the sinter furnace, faster heating and hence a shorter cycle time and higher capacity of the sintering system are possible.

The component manufacturer now has to decide at a very early stage which primary debinding method he wishes to use; the system question arises immediately. There are thus manufacturers which use catalytic debinding and remove the residual binder in the sinter furnace. There are also manufacturers which prefer preliminary solvent debinding with subsequent pyrolysis of the residual binder in a burnout furnace before the final sintering, and additionally those which, after preliminary solvent debinding, drive out the residual binder in the brown part in the sinter furnace.

Ready-to-use granules for catalytic debinding are available on the market. Operators of solvent debinding are generally backward-integrated and produce their own granules from purchased powders and binder components; however, the first ready-to-use granules for solvent debindings are also already on the market.

The system choice has the implicit disadvantage that a backward-integrated operator of a solvent debinding plant could bring commercially available molding compositions with a wide selection of different metal alloys and also ceramics, such as the granules intended for catalytic debinding, to readiness for production only with considerable financial investment, if at all.

The backward-integrated manufacturer thus has the choice between internal costly product development and investment into additional new debinding plants, or has to restrict itself in an inflexible manner to a smaller product range.

It is thus an object of the present invention to develop an improved binder for production of metallic or ceramic moldings, which is usable universally and flexibly and thus enables the free choice of the standard methods for binder removal.

The invention provides a binder B for production of ceramic or metallic moldings, comprising $B_1$) 40 to 95% by weight of at least one polyoxymethylene homo- or copolymer, $B_2$) 2 to 60% by weight of at least one polyether selected from poly-1,3-dioxolane, poly-1,3-dioxane, poly-1,3-dioxepane, polytetrahydrofuran, poly-p-dioxanone and copolymers thereof, $B_3$) 2 to 15% by weight of at least one aliphatic polyester selected from:

polyhydroxyalkanoates comprising structural units of the formula (I)

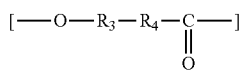

where $R_3$ is the $-(CH)_y(CH_2)_xCH_3$ moiety in which x is an integer from 0 to 2 and y is an integer from 0 to 1, and $R_4$ is the $(-CH_2-)_z$ moiety in which z is an integer from 1 to 5; polycondensates comprising structural units of the formula (II)

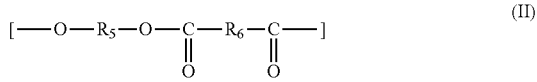

where $R_5$ is the $(-CH_2-)_m$ moiety in which m is an integer from 2 to 4, and $R_6$ is the $(-CH_2-)_n$ moiety in which m is an integer from 2 to 4;
polyalkylene carbonates comprising structural units of the general formula (III)

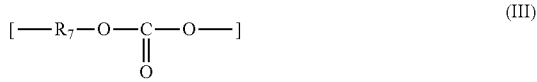

where $R_7$ is a $(C_1-C_6)$-alkylene radical;
and the stereoisomers and copolymers thereof,
where the sum of components $B_1$), $B_2$) and $B_3$) adds up to 100% by weight.

A BRIEF DESCRIPTION OF THE FIGURES

FIG. 1 illustrates elevation above the top of a component according to the invention.

A DETAILED DESCRIPTION OF THE INVENTION

The proportion of component $B_1$) is preferably 50 to 90% by weight, more preferably 50 to 80% by weight, based on the total amount of binder B).

The proportion of component $B_2$) is preferably 5 to 50% by weight, more preferably 15 to 45% by weight, based on the total amount of binder B).

The proportion of component $B_3$) is preferably 3 to 12% by weight, more preferably 4 to 10% by weight, based on the total amount of binder B).

The polyoxymethylene homo- or copolymers (POM) of component $B_1$) are known and commercially available as such. The homopolymers are prepared typically by polymerizing formaldehyde or trioxane, preferably in the presence of suitable catalysts. Polyoxymethylene copolymers preferred in the context of the invention likewise comprise trioxane and other cyclic or linear formals, or other formaldehyde sources, as main monomers. The term "main monomers" is intended to express the fact that the proportion of these monomers in the total amount of monomers, i.e. the sum of main monomers and comonomers, is greater than the proportion of comonomers in the total amount of monomers. Quite generally, such POM polymers have at least 50 mol % of repeat $-CH_2O-$ units in the main polymer chain. Suitable polyoxymethylene copolymers are described in EP-A 0 446 708 (page 3, line 39 to page 4, line 31). Polyacetals are available on the market, for example, from BASF under the Ultraform® brand name, and from Ticona under the Hostaform® brand name.

Suitable components $B_2$) are polyethers selected from poly-1,3-dioxolane, poly-1,3-dioxane, poly-1,3-dioxepane, polytetrahydrofuran, poly-p-dioxanone and copolymers thereof. Component $B_2$) can be at least partly decomposed under acid catalysis. The mean molecular weights (weight average) of the polyethers $B_2$) is preferably 600 to 100 000 g/mol, especially 2000 to 60 000 g/mol.

Among the aforementioned polyethers $B_2$) preference is given to poly-1,3-dioxolane, poly-1,3-dioxepane and polytetrahydrofuran.

Corresponding products are commercially available or easy to prepare. Polytetrahydrofuran can be purchased from BASF under the PolyTHF® brand name; poly-p-dioxanone is obtainable from Evonik under the Resomer® brand name.

The corresponding preparation processes, especially for polyethers based on 1,3-dioxepane, 1,3-dioxane and 1,3-dioxolane, proceed similarly to the way already described for polyacetal and are known to those skilled in the art, and so there is no need for any further details here. It is also possible to use mixtures of different polyethers and/or of polyethers of different molecular weights.

Suitable components $B_3$) are in principle all aliphatic polyesters. Especially suitable are polyhydroxyalkanoates comprising structural units of the formula (I)

where $R_3$ is the $-(CH)_y(CH_2)_xCH_3$ moiety in which x is an integer from 0 to 2 and y is an integer from 0 to 1, and $R_4$ is the $(-CH_2-)_z$ moiety in which z is an integer from 1 to 5, and mixtures thereof, stereoisomers thereof and copolymers thereof.

Examples of these polyhydroxyalkanoates are polyglycolide, polylactide, poly-4-hydroxybutanoate, poly-3-hydroxybutanoate, poly-3-hydroxyvalerate, poly-3-hydroxyhexanoate and polycaprolactone.

Examples of the copolymers are copolyesters of (L,D)-polylactide or copolyesters of the aforementioned hydroxybutanoates with 3-hydroxyvalerate or 3-hydroxyhexanoate, or copolyesters of polyglycolide, polylactide and polycaprolactone. Polyglycolide is sold, for example by Kureda under the Kuredux® brand name; polylactides in various L-D ratios are supplied by Natureworks under the Ingeo® brand name; a wide variety of copolymers of glycolide, L- and D-lactide and caprolactone are supplied by Evonik under the Resomer® brand name. Polycaprolactones are obtainable from Perstorp under the CAPA® brand name.

Poly-3-hydroxybutyrate-co-4-hydroxybutyrates are known especially from Metabolix. They are sold under the Mirel® trade name. Poly-3-hydroxybutyrate-co-3-hydroxyhexanoates are known from P&G or Kaneka. Poly-3-hydroxybutyrates are sold, for example, by PHB Industrial under the Biocycle® brand name and by Tianan under the Enmat® name.

Further aliphatic polyesters of good suitability are the polycondensates of dicarboxylic acids and diols, comprising structural units of the formula (II)

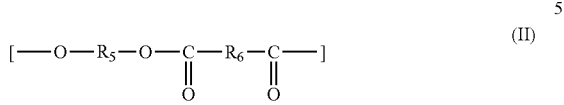

where $R_5$ is the $(-CH_2-)_m$ moiety in which m is an integer from 2 to 4, and $R_6$ is the $(-CH_2-)_n$ moiety in which m is an integer from 2 to 4, and mixtures thereof and copolymers thereof.

Examples of these polycondensates are polyethylene malonate and polybutylene malonate, polyethylene succinate and polybutylene succinate, polyethylene glutarate and polybutylene glutarate, polyethylene adipate and polybutylene adipate.

Suitable polybutylene succinates and polybutylene succinate-co-adipates are sold, for example by Showa Denko under the Bionolle® brand name. Polyethylene succinates and polyethylene succinate-co-adipate are supplied by Nippon Shokubai under the Lunare SE® brand name.

Further suitable polyesters are aliphatic polyalkylene carbonates comprising structural units of the general formula (III)

where $R_7$ is a $(C_1-C_6)$-alkylene radical, and mixtures thereof and copolymers thereof.

Examples of such polyalkylene carbonates are polyethylene carbonate and polypropylene carbonate. Suitable polyethylene carbonates and polypropylene carbonates are supplied, for example, by Empower Materials Inc. under the QPAC® brand name.

The aliphatic polyesters $B_3$) generally have a molecular weight (weight average) of 2000 to 1 000 000, preferably of 20 000 to 100 000.

The polyesters $B_3$) are preferably selected from poly-$(C_2$-$C_4)$-alkylene carbonate, poly-$(C_2$-$C_4)$-alkylene succinate, polylactide, polycaprolactone and polyhydroxybutanoate.

In a preferred embodiment of the invention, a binder B for production of ceramic or metallic moldings is provided, comprising $B_1$) 50 to 90% by weight of at least one polyoxymethylene homo- or copolymer;

$B_2$) 5 to 50% by weight of at least one polyether selected from poly-1,3-dioxolane, poly-1,3-dioxepane and polytetrahydrofuran, and copolymers thereof, $B_3$) 3 to 15% by weight of at least one aliphatic polyester selected from: poly-$(C_2$-$C_4)$-alkylene carbonate, poly-$(C_2$-$C_4)$-alkylene succinate, polylactide, polycaprolactone and polyhydroxybutanoate, and the stereoisomers and copolymers thereof, where the sum of components $B_1$), $B_2$) and $B_3$) adds up to 100% by weight.

The invention further provides a thermoplastic composition for the production of metallic or ceramic moldings, comprising A) 40 to 65% by volume of at least one inorganic sinterable powder A B) 35 to 60% by volume of a mixture of
$B_1$) 40 to 95% by weight of at least one polyoxymethylene homo- or copolymer,
$B_2$) 2 to 60% by weight of at least one polyether selected from: polypropylene oxide, poly-1,3-dioxolane, poly-1,3-dioxane, poly-1,3-dioxepane, polytetrahydrofuran, poly-p-dioxanone and copolymers thereof,
$B_3$) 2 to 15% by weight of at least one aliphatic polyester selected from:
polyhydroxyalkanoates comprising structural units of the formula (I)

where $R_3$ is the $-(CH)_y(CH_2)_xCH_3$ moiety in which x is an integer from 0 to 2 and y is an integer from 0 to 1, and $R_4$ is the $(-CH_2-)_z$ moiety in which z is an integer from 1 to 5;

polycondensates comprising structural units of the formula (II)

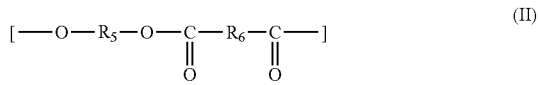

where $R_5$ is the $(-CH_2-)_m$ moiety in which m is an integer from 2 to 4, and
$R_6$ is the $(-CH_2-)_n$ moiety in which m is an integer from 2 to 4;

polyalkylene carbonates comprising structural units of the general formula (III)

where $R_7$ is a $(C_1-C_6)$-alkylene radical;
and the stereoisomers and copolymers thereof;
and C) 0 to 5% by volume of a dispersing aid, where the sum of components A), B) and C) adds up to 100% by weight.

The inorganic sinterable powder A can be selected from all known suitable inorganic sinterable powders. It is preferably selected from metal powders, metal alloy powders, metal carbonyl powders, ceramic powders and mixtures thereof.

Examples of metals which may be present in powder form include aluminum, iron, especially iron carbonyl powder, chromium, cobalt, copper, nickel, silicon, titanium and tungsten. Examples of pulverulent metal alloys include high- or low-alloy steels and metal alloys based on aluminum, iron, titanium, copper, nickel, tungsten or cobalt.

These include both powders of already finished alloys, for example superalloys such as IN713C, GMR 235 and IN 100, and the alloys known from magnet technology with the main constituents Nd—Fe—B and Sm—Co, and powder mixtures of the individual alloy constituents. The metal powders, metal alloy powders and metal carbonyl powders can also be used in a mixture.

Suitable inorganic powders are also oxidic ceramic powders such as $Al_2O_3$, $ZrO_2$, $Y_2O_3$, but also nonoxidic ceramic powders such as SiC, $Si_3N_4$, and more complex oxide powders such as $NiZnFe_2O_4$, and also inorganic color pigments such as $CoAl_2O_4$.

The particle sizes of the aforementioned powders are preferably 0.1 to 50 μm, more preferably 0.3 to 30 μm. The metal powders, metal alloy powders, metal carbonyl powders and ceramic powders can also be used in a mixture, for example for the production of hard metals such as WC/Co.

Any dispersing aid present as component C) may be selected from known dispersing aids. Examples are oligomeric polyethylene oxide with a mean molecular weight of 200 to 600, stearic acid, stearamide, hydroxystearic acid, fatty alcohols, fatty alcohol sulfonates and block copolymers of ethylene oxide and propylene oxide, and also polyisobutylene. Particular preference is given to using the dispersing aid in an amount of 1 to 5% by volume, based on components A), B) and C).

In addition, the thermoplastic compositions may also comprise customary additives and processing aids which favorably influence the rheological properties of the mixtures in the course of shaping.

The inventive thermoplastic compositions can be used to produce metallic or ceramic moldings from the powder A).

The present invention therefore also relates to a process for producing metallic or ceramic moldings from the inventive thermoplastic composition by injection molding, extrusion or compression to give a molding, then removing the binder and sintering, wherein the binder is removed by treating the molding according to one of the following variants:

variant 1 comprising the steps of:
1a) acid-catalyzed debinding of components $B_1$ and $B_2$ from the molding
and
1b) subsequent thermal debinding of components $B_3$ and, if present, C at 200 to 600° C.,
or
variant 2 comprising the steps of:
2a) extraction of at least 50% by weight of binder components $B_2$) and $B_3$) and, if present, C) from the molding by a solvent in which component $B_1$) is insoluble,
2b) removal of the solvent from the molding by drying,
2c) subsequent thermal at least partial debinding of component $B_1$) at 140 to 200° C. from the molding in an oxygenous atmosphere and
2d) optional thermal debinding at 200 to 600° C. of any residual amounts of components $B_1$), $B_2$), $B_3$) and/or C) still present,
or
variant 3 comprising the steps of:
3a) at least partial extraction of binder components $B_2$) and $B_3$) and if present, C) from the molding by a solvent in which component $B_1$) is insoluble,
3b) removal of the solvent from the molding by drying,
3c) subsequent acid-catalyzed at least partial debinding of component $B_1$) and residual amounts of component $B_2$) from the molding, and
3d) optional thermal debinding at 200 to 600° C. of any residual amounts of components $B_1$), $B_2$), $B_3$) and/or C) still present.

The inventive thermoplastic composition used in the process according to the invention can be produced in a customary manner in a kneader or extruder at temperatures of 150 to 200° C. (cf. EP-A 0 413 231). After cooling the composition, it can be granulated. In a preferred embodiment, the thermoplastic composition to be shaped can be produced by melting components B) and mixing in components A) and optionally C). For example, component B) can be melted in a twin-screw extruder at temperatures of preferably 150 to 220° C., especially 170 to 200° C. Component A) is subsequently metered into the melt stream of component B) in the required amount at temperatures within the same range. Advantageously, component A) comprises the dispersing aid(s) C) on the surface. However, the thermoplastic compositions can also be produced by melting components B) and C) in the presence of component A) at temperatures of 150 to 220° C.

For the shaping of the thermoplastic molding composition by injection molding, it is possible to use the customary screw and piston injection molding machines. The shaping is effected generally at temperatures of 175 to 200° C. and pressures of 3000 to 20 000 kPa in molds having a temperature of 60 to 140° C.

The catalytic debinding in steps 1a) and 3c) of the process according to the invention is effected by acid treatment of the molding, preferably at temperatures in the range from 80 to 180° C. over a period of preferably 0.1 to 24 hours, more preferably 0.5 to 12 hours. The treatment time required depends on the treatment temperature, the concentration and the type of the acid in the treatment atmosphere, and also on the size of the molding and on the particle size of the powder A. The acid concentration under the customary conditions is approximately 4 to 5% by volume of the atmosphere gas, which is generally nitrogen.

Suitable acids for the acid-catalyzed debinding in steps 1a) and 3c) of the process according to the invention are, for example, inorganic acids which are already in gaseous form at room temperature or at least are vaporizable at the treatment temperature. Examples are hydrohalic acids and nitric acid. Suitable organic acids are formic acid, acetic acid, oxalic acid or trifluoroacetic acid. Further suitable acids are $BF_3$ or the adducts thereof onto organic ethers.

If a customary carrier gas (inert gas, e.g. nitrogen) is used for the aforementioned acids, this can be passed through the acid beforehand and laden therewith. The carrier gas thus laden is then brought to the treatment temperature, which is appropriately higher than the loading temperature in order to avoid condensation of the acid. The acids can also vaporize themselves in the furnace space and be distributed rapidly in the furnace space by vortexing of the furnace atmosphere.

The acid is preferably supplied to the debinding furnace via a metering unit, vaporized in a flat dish and distributed homogeneously by circulation of the furnace atmosphere.

The acid treatment in steps 1a) and 3c) of the process according to the invention can be performed in customary equipment which works according to the principles as described in EP-A 0 413 231.

The catalytic debinding according to steps 1a) and 3c) of the process according to the invention can also advantageously, especially in the case of use of molding compositions comprising reactive and/or oxidation-sensitive sinterable powders A, be effected with acids which are solid at room temperature and sublime or melt and vaporize at higher temperatures, especially including those having a sublimation or melting point between 80 and 200° C. Preference is given to oxalic acid, preferably anhydrous oxalic acid, or oxalic acid dihydrate. Particular preference is given to using a solution of anhydrous oxalic acid in formic acid, acetic acid or mixtures thereof. Glyoxalic acid and malonic acid are additionally suitable. Other options include benzenesulfonic acid, naphthalenesulfonic acids and maleic acid, or mixtures thereof. The aforementioned acids can be used in the debinding either alone or else together with a carrier gas such as air, nitrogen or a noble gas.

In the latter embodiment, the acids used are generally first converted to the gas phase at the debinding temperature, act on the remaining binder $B_1$) from the gas phase and desublime or solidify after cooling on the walls of the debinding apparatus. In a subsequent debinding operation, they are converted back to the gas phase, which means that the acid effectively does not leave the apparatus.

To facilitate the metered addition, it may be appropriate to use the abovementioned acids which are solid at room temperature and sublime or melt and vaporize at higher temperatures in the form of a solution in polar solvents, preferably with boiling points below 200° C. Useful such polar solvents include in particular acetone, dioxane, ethanol and acetonitrile, but especially organic acids such as formic acid and/or acetic acid.

In the variant with acids which are solid at room temperature and sublime or melt and vaporize at higher temperatures, the acid treatment in steps 1a) and 3c) of the process according to the invention is preferably effected at temperatures in the range from 100 to 160° C.

The anhydrous oxalic acid is preferably supplied to the debinding furnace as a solution via a metering device, vaporized and distributed homogeneously by circulation of the furnace atmosphere.

The catalyst acid treatment in step 1a) of the process according to the invention is preferably performed until the binder components $B_1$) and $B_2$) in the molding have been removed to an extent of at least 90% by weight, preferably to an extent of 95% by weight, more preferably to an extent of 98% by weight.

The catalytic debinding in step 3c) of the process according to the invention is preferably performed until binder component $B_1$) in the molding has been removed to an extent of at least 20%, preferably to an extent of 50%, more preferably to an extent of 85%, most preferably to an extent of 95% or more.

It may be advantageous in step 3c) to catalytically remove binder component $B_1$) only partially, since the debound components typically still have to be moved to another furnace for sintering, and the molding strength may then become insufficient. In such cases, the removal of only 20 to 50% of binder component $B_1$) may be appropriate to the aim; the remaining stabilizing residue can then be removed thermally in the sinter furnace with an adjusted cycle.

Should this be unnecessary, the aim in step 3c) should be a removal of 85% by weight, preferably 95% by weight or more, of binder component $B_1$).

In the extraction of binder components $B_2$), $B_3$) and, if present, C) from the molding according to steps 2a) and 3a) of the process according to the invention, the selection of the solvent is guided by the chemical nature of the aforementioned components. It is also possible to use mixtures of suitable solvents.

The preferred binder components $B_2$), $B_3$) and, if present, C) can be dissolved, for example in aprotic organic solvents such as ethers, esters, amides or ketones, for example tetrahydrofuran, diethyl ether, butyrolactone, dimethylformamide, methyl ethyl ketone or acetone, but also in protic organic solvents such as $C_1$-$C_6$-alcohols, e.g. ethanol and isopropanol; poly-1,3-dioxolane can additionally be dissolved in water.

If water can be used as a solvent, it is particularly preferred since water due to non-combustibility enables even simpler and additionally environmentally more compatible handling.

For reactive and/or oxidation-sensitive sinter powders A, in the case of use of water as a solvent, a customary corrosion inhibitor is preferably added thereto, for example, modified phosphonates such as aminotris(methylenephosphonic acid), hydroxyethylaminodi(methylenephosphonic acid) or phosphonobutane-1,2,4-tricarboxylic acid, obtainable for example from Zschimmer & Schwarz.

Exceptionally reactive sinter powders A are preferably treated with aprotic organic solvents, such as tetrahydrofuran, diethyl ether, butyrolactone, dimethylformamide, methyl ethyl ketone, or preferably acetone.

The treatment of the molding with a solvent according to steps 2a) and 3a) of the process according to the invention can be performed in conventional equipment with a closed solvent circuit for the cleaning of processed workpieces contaminated with lubricant, described by way of example in DE-A 4337129. Preferably, steps 2a) and 3a) are effected at elevated temperature up to a maximum of 120° C. in order to accelerate the dissolution process; more preferably steps 2a) and 3a) are effected at boiling temperature of the solvent under reflux.

The binder component $B_1$) used as residual binder for steps 2a) and 3a) of the process according to the invention—polyoxymethylene homo- and copolymers (POM)—is resistant to virtually all standard solvents up to 120° C. and still guarantees a very high strength even at higher temperatures up to 120° C.

It is advantageous when, in steps 2a) and 3a) of the process according to the invention, in the course of extraction, a great concentration difference exists between the soluble binder components $B_2$), $B_3$) and, if present, C) in the molding and the solvent. The latter can be achieved by exchanging the laden solvent frequently for fresh solvent and/or rapidly conducting the dissolved extract away from the surface of the extraction material, for example by a circulation.

It may be the case and may even be desirable that binder components $B_2$) and/or $B_3$) and, if present, C) are only partially soluble in the solvent selected and are only partially removable in the preliminary solvent debinding according to steps 2a) and 3a). Partial removal of the aforementioned binder components may be advantageous for the strength of the moldings with regard to handling in the thermal or catalytic debinding which is still to follow.

Alternatively, the residual binder function desired for the conversion in the sinter furnace may also arise from only incomplete removal of component $B_1$) in the thermal debinding according to step 2c) or in the catalytic debinding according to step 3c).

Component C) may likewise be soluble in the same solvents as component(s) $B_2$) and/or $B_3$), which is generally advantageous.

The treatment with a solvent according to steps 2a) and 3a) of the process according to the invention is preferably performed until the binder components $B_2$), $B_3$) and C) have been removed from the molding to an extent of at least 50% by weight, preferably to an extent of 70% by weight, more preferably to an extent of 80% by weight, This state is generally attained after 4 to 40 hours. The treatment time required depends on the treatment temperature, on how good the solvent is for binder components $B_2$), $B_3$) and C), on the molecular weight of binder components $B_2$), $B_3$) and C), and also on the size of the molding.

After the extraction according to steps 2a) and 3a) the green parts, which are now porous and saturated with solvent, still have to be dried. The molding is preferably dried in a conventional manner, for example with the aid of a vacuum drying furnace, a heated cabinet or a circulation furnace, according to steps 2b) and 3b) of the process according to the invention.

However, the drying can also advantageously be integrated into steps 2c) and 3c) of the process according to the invention. In this case, both the drying and the thermal or catalytic debinding according to steps 2c) and 3c) of component $B_1$) can be performed in the same apparatus, for example, in a circulation furnace, as a result of which transfer of the brown parts is unnecessary.

Preferably, the solvent is removed in a separate step 2b) and 3b). In this case, the drying temperature is guided by the boiling temperature of the solvent, but is preferably selected at a somewhat lower level in order to avoid the risk of an abrupt or excessively rapid drying operation with possible negative consequences for the quality of the green part. Typically, the drying according to steps 2b) and 3b) of the process according to the invention is complete within 0.5 to 8 h.

The oxidative thermal debinding 2c) of component $B_1$) in the process according to the invention takes place in furnace systems in which the moldings are exposed to a suitable temperature in the range from 140 to 200° C. in an oxygenous atmosphere for a defined period. The construction and the materials of the furnace must ensure that the temperature in the furnace volume is the same everywhere, and good heat transfer to the moldings to be debound is achieved. More particularly, cold sites in the interior of the furnace system should be avoided in order to prevent the condensation of decomposition products. An oxygenous atmosphere is understood to mean a gas mixture composed of an inert gas such as nitrogen or argon with 1 to 100% by volume of oxygen, preference being given to air. In the case of batch furnaces, the prior art discloses internals or circulation elements which ensure homogeneous distribution and vortexing of the furnace atmosphere, such that all moldings are subject to very substantially identical thermal conditions.

A preferred furnace is a customary circulation furnace for heat treatments. Especially in the case of relatively high loading of the furnace, not only gas vortexing but sufficient fresh gas supply is necessary (at least tenfold exchange), in order to sufficiently dilute the formaldehyde decomposition product (<4% by volume) and hence to keep the furnace in a safe operating state since, for example, air/formaldehyde mixtures are ignitable.

The oxidative thermal residual debinding according to step 2c) of the process according to the invention is preferably performed until the binder component $B_1$) has been removed from the molding at least to an extent of 20% by weight, preferably to an extent of 50% by weight, more preferably to an extent of 85% by weight.

It may be desirable not to thermally remove the whole amount of polyacetal present, since the debound components typically still have to be transferred to another furnace for sintering, and the molding strength may then be insufficient. In such cases, the removal of only 20 to 50% by weight of the maximum amount of the binder component $B_1$) may be more appropriate to the aim; the remaining stabilizing residue can then be thermally removed in the sinter furnace with an adapted cycle.

The residual binder amount of component $B_3$) still present after step 1a) can be driven out by gradual heating in step 1b), typically integrated into the sinter cycle. The same also applies in steps 2d) and 3d) for any residual amounts of components $B_1$), $B_2$), $B_3$), and/or C) still present.

The thermal residual debinding or pyrolysis according to steps 1b), 2d) and 3d) can take place under reduced pressure, typically in the sinter furnace, or else in a carrier gas to conduct the decomposition products out. Typically, for metal powder, the carrier gas selected is an inert gas such as nitrogen or argon, or else a reducing gas, for example hydrogen. For ceramic powder, the carrier gas selected is typically air or, especially in the case of nonoxide ceramic, an inert gas, or the thermal residual debinding is performed under reduced pressure.

The decomposition range of the residual binder depends on the polymer and on the atmosphere selected, but is typically within the temperature range from 200 to 600° C. Within this temperature range a reduced heating rate of 5° C./min, preferably 3° C./min, more preferably 2° C./min, is advisable. At the temperature of the maximum decomposition rate of the polymer, a hold stage with a length of 0.25 to 4 h, preferably from 0.5 to 1 h, can be introduced. For this purpose, it is then possible to select a higher heating rate, e.g. 3 to 5° C./min, in the adjoining temperature ranges below and above this characteristic temperature.

The product which has thus been freed of the binder by the process according to the invention can be converted in a customary manner by sintering at temperatures above 600° C. to 2000° C. to a metallic or ceramic molding. The sintering can optionally be effected with an accelerated heating rate of 5 to 10° C./min within the temperature range from 200 to 600° C., provided that there is no longer any residual binder.

The inventive molding compositions are usable universally and are suitable for various types of process for production of moldings. The inventive moldings can be used as structural components.

The invention is illustrated in detail hereinafter by examples:

In the examples which follow, test compositions were homogenized in a cone mixer, and homogenized and pelletized in a laboratory extruder heated to 190° C.

The test composition comprising ceramic powder according to example 9 was produced in a sigma kneader heated to 180° C. with a knead time of 2 h.

EXAMPLE 1

Molding composition 1 had the following composition:
56.75% by volume of a mixture of 98% by weight of carbonyl iron powder and 2% by weight of carbonyl nickel powder (FN2)
43.25% by volume of binder, comprising
62% by weight of polyoxymethylene with 2 mol % of 1,3-dioxepane
29% by weight of polydioxolane (PDL) with a molar mass of 28 000,
9% by weight of polylactide (PLA) with a molar mass of 120 000

In molding composition 1, the proportion by weight of binder components B1, B2, and B3 is thus as follows:
B1 7.26% by weight
B2 3.39% by weight
B3 1.11% by weight

EXAMPLE 2

Molding composition 2 had the following composition:
56.75% by volume of a mixture of 98% by weight of carbonyl iron powder and 2% by weight of carbonyl nickel powder (FN2)
43.25% by volume of binder, comprising
48% by weight of polyoxymethylene with 2 mol % of 1,3-dioxepane 43% by weight of polydioxolane (PDL) with a molar mass of 28 000,
9% by weight of polylactide (PLA) with a molar mass of 120 000

In molding composition 2, the proportion by weight of binder components B1, B2, and B3 is thus as follows:
B1 5,62% by weight
B2 5.05% by weight
B3 1.08% by weight

EXAMPLE 3

Molding composition 3 had the following composition:
56.75% by volume of a mixture of 98% by weight of carbonyl iron powder and 2% by weight of carbonyl nickel powder (FN2)
43.25% by volume of binder, comprising
  86% by weight of polyoxymethylene with 2 mol % of 1,3-dioxepane
  3% by weight of polytetrahydrofuran (PTHF) with the molar mass of 2000,
  11% by weight of polybutylene succinate (PBS) with a molar mass of 109 000

In molding composition 3, the proportion by weight of binder components B1, B2, and B3 is thus as follows:
B1 10.17% by weight
B2 0.36% by weight
B3 1.32% by weight

EXAMPLE 4

Molding composition 4 had the following composition:
56.75% by volume of a mixture of 98% by weight of carbonyl iron powder and 2% by weight of carbonyl nickel powder (FN2)
43.25% by volume of binder, comprising
  67% by weight of polyoxymethylene with 2 mol % of 1,3-dioxepane
  24% by weight of polydioxolane (PDL) with a molar mass of 12 500,
  9% by weight of polybutylene succinate (PBS) with a molar mass of 109 000

In molding composition 4, the proportion by weight of binder components B1, B2, and B3 is thus as follows:
B1 7.90% by weight
B2 2.81% by weight
B3 1.13% by weight

EXAMPLE 5

Molding composition 5 had the following composition:
56.75% by volume of a mixture of 98% by weight of carbonyl iron powder and 2% by weight of carbonyl nickel powder (FN2)
43.25% by volume of binder, comprising
  68% by weight of polyoxymethylene with 2 mol % of 1,3-dioxepane
  24% by weight of polydioxolane (PDL) with a molar mass of 28 000,
  8% by weight of polycaprolactone (PCL) with a molar mass of 23 600

In molding composition 5, the proportion by weight of binder components B1, B2, and B3 is thus as follows:
B1 7.91% by weight
B2 2.81% by weight
B3 0.99% by weight

EXAMPLE 6

Molding composition 6 had the following composition:
56.75% by volume of a mixture of 98% by weight of carbonyl iron powder and 2% by weight of carbonyl nickel powder (FN2)
43.25% by volume of binder, comprising
  79% by weight of polyoxymethylene with 2 mol % of 1,3-dioxepane
  16% by weight of polydioxepane (PDP) with a molar mass of 33 000,
  5% by weight of poly-3-hydroxybutyrate-co-3-hydroxyvalerate, (PHBV) with a molar mass of 840 000

In molding composition 6, the proportion by weight of binder components B1, B2, and B3 is thus as follows:
B1 9.08% by weight
B2 1.90% by weight
B3 0.55% by weight

EXAMPLE 7

Molding composition 7 had the following composition:
56.75% by volume of a mixture of 98% by weight of carbonyl iron powder and 2% by weight of carbonyl nickel powder (FN2)
43.25% by volume of binder, comprising
  69% by weight of polyoxymethylene with 2 mol % of 1,3-dioxepane
  29% by weight of polydioxolane (PDL) with a molar mass of 28 000,
  2.4% by weight of polypropylene carbonate (PPC) with a molar mass of 89 000

In molding composition 7, the proportion by weight of binder components B1, B2, and B3 is thus as follows:
B1 8.14% by weight
B2 3.41% by weight
B3 0.29% by weight

EXAMPLE 8

Molding composition 8 had the following composition:
64% by volume of a metal powder of composition 316L (DIN 1.4404) with a mean particle size of 10 μm
36% by volume of binder, comprising
  62% by weight of polyoxymethylene with 2 mol % of 1,3-dioxepane
  29% by weight of polydioxolane (PDL) with a molar mass of 28 000,
  9% by weight of polylactide (PLA) with a molar mass of 120 000

In molding composition 8, the proportion by weight of binder components B1, B2, and B3 is thus as follows:
B1 5.31% by weight
B2 2.43% by weight
B3 0.80% by weight

EXAMPLE 9

Molding composition 9 had the following composition:
47% by volume of a ceramic powder of composition $ZrO_2$—5% by weight of $Y_2O_3$ (TZP) with a mean particle size of 0.3 μm 51% by volume of binder, comprising
- 79% by weight of polyoxymethylene with 2 mol % of 1,3-dioxepane
- 19% by weight of polydioxepane (PDP) with a molar mass of 12 500,
- 2% by weight of polybutylene succinate (PBS) with a molar mass of 109 000

2% by volume of dispersant C, an ethoxylated fatty alcohol with the molar mass of 600

In molding composition 9, the proportion by weight of binder components B1, B2, and B3 is thus as follows:
B1 13.56% by weight
B2 3.30% by weight
B3 0.41% by weight
C 1.70% by weight Injection Molding Tests of Real Components The study of the general suitability of the test compositions was conducted with a complex and heavy component, a hinge of complex geometry injection molded with two film gates at positions 1 (FIG. 1: elevation above, top view of the component below).

The length of the component was 100 mm, the weight of the sintered part obtained for examples 1 to 7 was approx. 34 g, for example 8 approx. 40 g and for example 9 approx. 26 g.

This ensures that the results of the tests are also relevant in practice, since this component's own weight makes above-average demands on strength after debinding.

Study of Processing on the Injection Molding Machine

The test compositions were melted in the barrel of the injection molding machine at 190° C.; the injection mold was heated to 135° C. In general, the injection pressure required was approx. 1500-1800 bar, a normal value for POM-based injection molding compositions.

The test compositions differed in the cooling time required before demolding. The test compositions with a higher proportion of component $B_2$ (30% or higher) were somewhat softer and required a longer cooling time to be able to demold the green part intact; the green parts also exhibited a somewhat greater level of streaks on the surface.

For all test compositions, processing was possible in a customary manner. Only test composition 2 with a high PDL content could be processed only with a pressure of 600 bar. In addition, the melt temperature and the mold temperature had to be lowered by approx. 10° C.

Study of Debinding and of Sintering
Variant 1—Catalytic and Thermal Debinding

The primary catalytic acid debinding was performed with the components of examples 1 to 9 in a 50 l laboratory furnace at 110° C. It was purged with 500 l/h of nitrogen for inertization; after 1 h, 30 ml/h of $HNO_3$ were metered into the furnace which was still being purged with 500 l/h of nitrogen and vaporized.

Thus, the green parts from examples 1-9 were subjected to catalytic debinding. After 6 h of debinding time, the content of catalytically decomposable binder components ($B_1+B_2$) have been removed from all components to an extent of at least 90% (Table 1).

TABLE 1

Effect of acid-catalytic debinding

| Example | % by weight loss catalytic | loss in % ($B_1 + B_2$) |
|---|---|---|
| 1) FN2 - 29 PDL - 9 PLA | 10.38 | 97.6 |
| 2) FN2 - 43 PDL - 9 PLA | 10.38 | 97.3 |

TABLE 1-continued

Effect of acid-catalytic debinding

| Example | % by weight loss catalytic | loss in % ($B_1 + B_2$) |
|---|---|---|
| 3) FN2 - 3 PTHF - 11 PBS | 9.58 | 94.2 |
| 4) FN2 - 24 PDL - 9 PBS | 9.78 | 91.3 |
| 5) FN2 - 24 PDL - 8 PCL | 9.95 | 92.8 |
| 6) FN2 - 16 PDP - 5 PHBV | 10.45 | 95.2 |
| 7) FN2 - 29 PDL - 2.4 PPC | 11.46 | 99.2 |
| 8) 316L - 29 PDL - 9 PLA | 7.71 | 99.6 |
| 9) TZP - 19 PDP - 2 PBS | 16.44 | 97.5 |

The powder moldings obtained after debinding from examples 1 to 7 were first thermally debound at temperatures from RT to 600° C. in a 30 l sinter furnace with molybdenum lining and molybdenum sinter elements under nitrogen, and then sintered at higher temperatures up to 1280° C. under nitrogen of 4.8 quality.

The sinter curve was as follows:
room temperature to 600° C. at 5° C./min
hold time at 600° C.: 1 h
600° C. to 1280° C. at 5° C./min.
hold time at 1280° C.: 1 h
cooling at 5° C./min to 1000° C.
furnace off, natural cooling.

With this sinter program, it was possible for almost all molding compositions according to examples 1 to 7 to achieve intact sintered parts with a good sinter density of at least 7.59 g/cm³ (see Table x).

Only the molding composition according to example 4 achieved a sinter density of 7.42 g/cm³ under these conditions. A good density of 7.61 g/cm³ was achieved with this molding composition with a reduced heating rate of 3° C./min in the range from RT to 600° C.; this finding substantiates the preferred lower limit of 90% for the catalytic debinding of POM according to variant 1, since the lower heating rate adversely affects the capacity of the sinter furnace and hence the economic viability of the process.

The molding according to example 8 obtained by the process according to the invention was sintered in the same sinter furnace under hydrogen of 4.8 quality. The sinter curve was as follows:
room temperature to 600° C. at 5° C./min
hold time at 600° C.: 1 h
600° C. to 1380° C. at 5° C./min.
hold time at 1380° C.: 1 h
cooling at 5° C./min to 1000° C.
furnace off, natural cooling.

Here too it was possible to obtain intact sintered parts. The sintered parts achieved a good sinter density of 7.89 g/cm³.

The powder molding of example 9 obtained after the catalytic debinding was sintered in air in a commercial ceramic sinter furnace with the following program:
room temperature to 270° C. at 3° C./min
hold time at 270° C.: 1 h
270° C. to 1500° C. at 3° C./min.
hold time at 1500° C.: 1 h
cooling at 5° C./min to 1000° C.
furnace off, natural cooling.

The resulting sintered parts were intact and free of faults, and had a good sinter density of 6.05 g/cm³.

TABLE 2

Sinter density of the thermal debound and sintered moldings

| Example | Sinter density g/cm³ |
|---|---|
| 1) FN2 - 29 PDL - 9 PLA | 7.63 |
| 2) FN2 - 43 PDL - 9 PLA | 7.62 |
| 3) FN2 - 3 PTHF - 11 PBS | 7.59 |
| 4) FN2 - 24 PDL - 9 PBS | 7.42 (7.61) |
| 5) FN2 - 24 PDL - 8 PCL | 7.59 |
| 6) FN2 - 16 PDP - 5 PHBV | 7.60 |
| 7) FN2 - 29 PDL - 2.4 PPC | 7.63 |
| 8) 316L - 29 PDL - 9 PLA | 7.89 |
| 9) TZP - 19 PDP - 2 PBS | 6.05 |

Variant 2—Solvent Debinding+Thermal Debinding

The green parts produced from the test compositions were pretreated in a solvent, then the molding was dried, residual binder was removed thermally and the molding was sintered.

For the solvent debinding, the green parts were treated in a stirred three-neck flask in boiling solvent (acetone, ethanol, water and chloroform were used) under reflux for 24 h. Only example 8 had to be treated for the debinding in water for 48 h.

The weight loss was determined after drying in a forced air oven at the boiling temperature of the solvent for 4 h.

TABLE 3

Effect of solvent debinding

| Example | Solvent | % by weight loss (24 h) | Loss in % ($B_2 + B_3$) |
|---|---|---|---|
| 1) FN2 - 29 PDL - 9 PLA | acetone | 3.67 | 81.5 |
|  | ethanol | 3.43 | 76.2 |
| 2) FN2 - 43 PDL - 9 PLA | acetone | 5.25 | 85.6 |
| 3) FN2 - 3 PTHF - 11 PBS | chloroform | 1.32 | 78.6 |
| 4) FN2 - 24 PDL - 9 PBS | acetone | 2.36 | 59.9 |
| 5) FN2 - 24 PDL - 8 PCL | acetone | 3.47 | 91.3 |
| 6) FN2 - 16 PDP - 5 PHBV | acetone | 1.60 | 65.3 |
| 7) FN2 - 29 PDL - 2.4 PPC | acetone | 3.27 | 88.4 |
| 8) 316L - 29 PDL - 9 PLA | acetone | 2.67 | 82.7 |
|  | water 48 h | 2.33 | 72.1 |
| 9) TZP - 19 PDP - 2 PBS | acetone | 4.30 | 79.5 * |

* in % of ($B_2 + B_3 + C$)

The green parts from examples 1 and 8 show that the selection of the solvent (acetone, ethanol or water) is one factor in deciding whether and how much of binder component $B_3$) is dissolved.

Example 8 shows solvent debinding of poly-1,3-dioxolane as component $B_2$) with water. The debinding is only half as rapid, but otherwise works impeccably.

Subsequently, the moldings were subjected to further thermal debinding in air. The thermal debinding was conducted in a gastight 50 l furnace with air circulation purged with 500 l/h of air. The moldings were treated in the furnace heated to 165° C. for 12 h. The moldings were then removed and the weight loss was determined (Table 4).

TABLE 4

Effect of thermal debinding

| Example | Solvent | % by weight loss thermal |
|---|---|---|
| 1) FN2 - 29 PDL - 9 PLA | acetone | 7.50 |
|  | ethanol | 7.42 |
| 2) FN2 - 43 PDL - 9 PLA | acetone | 5.96 |
| 3) FN2 - 3 PTHF - 11 PBS | chloroform | 10.04 |
| 4) FN2 - 24 PDL - 9 PBS | acetone | 3.04 ** (9.17) |
| 5) FN2 - 24 PDL - 8 PCL | acetone | 7.79 |
| 6) FN2 - 16 PDP - 5 PHBV | acetone | 2.97 ** (9.02) |
| 7) FN2 - 29 PDL - 2.4 PPC | acetone | 8.18 |
| 8) 316L - 29 PDL - 9 PLA | acetone | 5.45 |
|  | water 48 h | 5.35 |
| 9) TZP - 19 PDP - 2 PBS | acetone | 12.14 |

** cracks in the molding

The weight loss determined in most of the examples is close to or somewhat greater than the content of binder component $B_1$) and demonstrates the effectiveness of the process according to the invention. The additional weight loss originates from the residue of binder component $B_2$), which was not dissolved in the preceding solvent debinding, and is then degraded in the thermal debinding.

The components of examples 4 and 6 show cracks or delaminations; the weight loss is well below the value to be expected from the content of component $B_1$). The loss of binder components $B_2$) and $B_3$) in step 2a) here was lower than the preferred 70%. With a much slower staged program, it was possible, however, to thermally debind these moldings intact. For this purpose the following program was used:

| Stage | $T_1$ [° C.] | $T_2$ [° C.] | Heating rate [° C./h] | Residence time at $T_2$ [h] |
|---|---|---|---|---|
| 0 | RT | 130 | 300 | 1 |
| 1 | 130 | 140 | 10 | 6 |
| 2 | 140 | 150 | 10 | 16 |
| 3 | 150 | 160 | 10 | 1 |
| 4 | 160 | 170 | 10 | 1 |
| 5 | 170 | 170 | — | 5 |

With this heating program, it was possible to obtain moldings debound intact; the weight loss is reported in brackets in table 3. It is thus possible to work with at least 50% weight loss of binder components $B_2$) and $B_3$) in step 2a).

However, the slower program reduces economic viability and in practice often has to be finely adjusted and adapted depending on the geometry and wall thickness of the molding, and is therefore more costly and inconvenient.

The moldings treated by the 2-stage debinding process of variant 2 were sintered as described for variant 1. The sintered parts, including those from examples 4 and 6 with the slower heating program, were intact and free of faults (Table 5).

TABLE 5

Sinter densities of the sintered moldings

| Example | Solvent | Sinter density g/cm³ |
|---|---|---|
| 1) FN2 - 29 PDL - 9 PLA | acetone | 7.63 |
|  | ethanol | 7.61 |
| 2) FN2 - 43 PDL - 9 PLA | acetone | 7.62 |
| 3) FN2 - 3 PTHF - 11 PBS | chloroform | 7.63 |
| 4) FN2 - 24 PDL - 9 PBS | acetone | — (7.60) |
| 5) FN2 - 24 PDL - 8 PCL | acetone | 7.59 |
| 6) FN2 - 16 PDP - 5 PHBV | acetone | — (7.59) |
| 7) FN2 - 29 PDL - 2.4 PPC | acetone | 7.61 |

TABLE 5-continued

Sinter densities of the sintered moldings

| Example | Solvent | Sinter density g/cm³ |
|---|---|---|
| 8) 316L - 29 PDL - 9 PLA | acetone | 7.94 |
|  | water 48 h | 7.93 |
| 9) TZP - 19 PDP - 2 PBS | acetone | 6.06 |

Variant 3—Solvent Debinding+Catalytic Debinding

The solvent debinding was effected with the molding compositions of examples 1 to 9 in the same solvents as in variant 2.

Subsequently, the moldings were dried at 60° C. The drying and the catalytic debinding were conducted in a gastight 50 l furnace with circulation, purged with 500 l/h of nitrogen. The catalytic debinding was conducted as in variant 1. Thereafter, the moldings preliminarily debound in the solvent were dried in a forced air oven at the boiling temperature of the solvent and subjected to catalytic debinding as for variant 1.

The weight loss was determined in relation to the weight of the untreated molding (Table 6).

TABLE 6

Effect of solvent debinding and catalyst debinding

| Example | Solvent | % by weight loss (24 h) | % by weight loss catalytic |
|---|---|---|---|
| 1) FN2 - 29 PDL - 9 PLA | acetone | 3.67 | 7.58 |
|  | ethanol | 3.43 | 7.56 |
| 2) FN2 - 43 PDL - 9 PLA | acetone | 5.25 | 6.02 |
| 3) FN2 - 3 PTHF - 11 PBS | chloroform | 1.32 | 10.11 |
| 4) FN2 - 24 PDL - 9 PBS | acetone | 2.36 | 7.56 |
| 5) FN2 - 24 PDL - 8 PCL | acetone | 3.47 | 7.87 |
| 6) FN2 - 16 PDP - 5 PHBV | acetone | 1.78 | 9.06 |
| 7) FN2 - 29 PDL - 2.4 PPC | acetone | 3.27 | 8.29 |
| 8) 316L - 29 PDL - 9 PLA | acetone | 2.67 | 5.47 |
|  | water 48 h | 2.33 | 5.42 |
| 9) TZP - 19 PDP - 2 PBS | acetone | 4.30 | 13.14 |

The weight loss determined after catalytic debinding in all examples is again usually just below or somewhat above the content of binder component $B_1$ and demonstrates the effectiveness of this variant of the process according to the invention.

The additional weight loss here too originates from the residue of binder component $B_2$, which was not dissolved in the preceding solvent debinding and is also degraded in the catalytic debinding.

All moldings obtained by the two-stage debinding process of variant 3 were sintered as described for variant 1. The sintered parts were intact and free of faults (Table 7).

TABLE 7

Sinter densities of the moldings treated according to variant 3

| Example | Solvent | Sinter density g/cm³ |
|---|---|---|
| 1) FN2 - 29 PDL - 9 PLA | acetone | 7.62 |
|  | ethanol | 7.62 |
| 2) FN2 - 43 PDL - 9 PLA | acetone | 7.62 |
| 3) FN2 - 3 PTHF - 11 PBS | chloroform | 7.62 |
| 4) FN2 - 24 PDL - 9 PBS | acetone | 7.61 |
| 5) FN2 - 24 PDL - 8 PCL | acetone | 7.60 |
| 6) FN2 - 16 PDP - 5 PHBV | acetone | 7.60 |
| 7) FN2 - 29 PDL - 2.4 PPC | acetone | 7.62 |

TABLE 7-continued

Sinter densities of the moldings treated according to variant 3

| Example | Solvent | Sinter density g/cm³ |
|---|---|---|
| 8) 316L - 29 PDL - 9 PLA | acetone | 7.91 |
|  | water 48 h | 7.90 |
| 9) TZP - 19 PDP - 2 PBS | acetone | 6.06 |

The invention claimed is:

1. A binder B for production of ceramic or metallic moldings, comprising
   $B_1$) 40 to 95% by weight of at least one polyoxymethylene homo- or copolymer,
   $B_2$) 2 to 60% by weight of at least one polyether selected from the group consisting of from poly-1,3-dioxolane, poly-1,3-dioxane, poly-1,3-dioxepane, polytetrahydrofuran, poly-p-dioxanone and copolymers thereof,
   $B_3$) 2 to 15% by weight of at least one aliphatic polyester selected from the group consisting of from:
   i) polyhydroxyalkanoates comprising structural units of the formula (I)

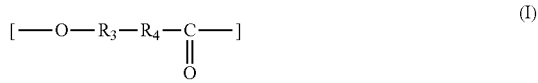

where $R_3$ is the —(CH)$_y$(CH$_2$)$_x$CH$_3$ moiety in which x is an integer from 0 to 2 and y is an integer from 0 to 1, and $R_4$ is the (—CH$_2$—)$_z$ moiety in which z is an integer from 1 to 5;
   ii) polycondensates comprising structural units of the formula (II)

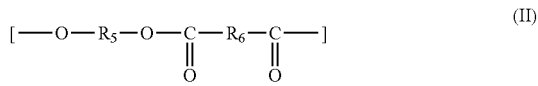

where $R_5$ is the (—CH$_2$—)$_m$ moiety in which m is an integer from 2 to 4, and $R_6$ is the (—CH$_2$—)$_n$ moiety in which m is an integer from 2 to 4;
polyalkylene carbonates comprising structural units of the general formula (III)

where $R_7$ is a (C$_1$-C$_6$)-alkylene radical;
and the stereoisomers and copolymers thereof,
where the sum of components $B_1$), $B_2$) and $B_3$) does not exceed 100% by weight.

2. The binder B according to claim 1, comprising
   $B_1$) 50 to 90% by weight of at least one polyoxymethylene homo- or copolymer;
   $B_2$) 5 to 50% by weight of at least one polyether selected from the group consisting of from poly-1,3 dioxolane, poly-1,3-dioxepane, polytetrahydrofuran, and copolymers thereof,
   $B_3$) 3 to 12% by weight of at least one aliphatic polyester selected from the group consisting of from: poly-(C$_2$-C$_4$)-alkylene carbonate, poly-(C$_2$-C$_4$)-alkylene succinate, polylactide, polycaprolactone, polyhydroxybutanoate, and the stereoisomers and copolymers thereof, where the sum of components $B_1$), $B_2$) and $B_3$) does not exceed 100% by weight.

3. A thermoplastic composition for the production of metallic or ceramic moldings, comprising
A) 40 to 65% by volume of at least one inorganic sinterable powder A
B) 35 to 60% by volume of a mixture of
$B_1$) 40 to 95% by weight of at least one polyoxymethylene homo- or copolymer,
$B_2$) 2 to 60% by weight of at least one polyether selected from the group consisting of from poly-1,3 dioxolane, poly-1,3-dioxane, poly-1,3-dioxepane, polytetrahydrofuran, poly-p-dioxanone and copolymers thereof,
$B_3$) 2 to 15% by weight of at least one aliphatic polyester selected from the group consisting of from:
i) polyhydroxyalkanoates comprising structural units of the formula (I)

where $R_3$ is the $-(CH)_y(CH_2)_xCH_3$ moiety in which x is an integer from 0 to 2 and y is an integer from 0 to 1, and $R_4$ is the $(-CH_2-)_z$ moiety in which z is an integer from 1 to 5;
ii) polycondensates comprising structural units of the formula (II)

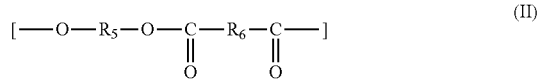

where $R_5$ is the $(-CH_2-)_m$ moiety in which m is an integer from 2 to 4, and $R_6$ is the $(-CH_2-)_n$ moiety in which m is an integer from 2 to 4;
iii) polyalkylene carbonates comprising structural units of the general formula (III)

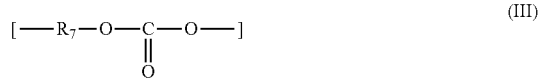

where $R_7$ is a $(C_1-C_6)$-alkylene radical;
and the stereoisonners and copolymers thereof; and
C) 0 to 5% by volume of a dispersing aid,
where the sum of components A), B) and C) does not exceed 100% by weight.

4. The thermoplastic composition according to claim 3, wherein the inorganic sinterable powder A is selected from the group consisting of from metal powders, metal alloy powders, metal carbonyl powders, ceramic powders and mixtures thereof.

5. A metallic or ceramic molding produced from thermoplastic molding compositions according to claim 3.

6. A process for producing metallic or ceramic moldings from the thermoplastic composition according to claim 3 by injection molding, extrusion or compression to give a molding, then removing the binder and sintering, wherein the binder is removed by treating the molding according to one of the following variants:
Variant 1 comprising the steps of:
1a) acid-catalyzed debinding of components $B_1$ and $B_2$ from the molding and
1b) subsequent thermal debinding of components $B_3$ and, if present, C at 200-600° C.,
or
Variant 2 comprising the steps of:
2a) extracting at least 50% by weight of binder components $B_2$) and $B_3$) and,
if present, C) from the molding by a solvent in which component $B_1$) is insoluble,
2b) removing the solvent from the molding by drying,
2c) subsequent thermal at least partial debinding of component $B_1$) at 140-200° C. from the molding in an oxygenous atmosphere and
2d) optional thermal debinding at 200-600° C. of any residual amounts of components $B_1$), $B_2$), $B_3$) and/or C) still present,
or
Variant 3 comprising the steps of:
3a) at least partial extracting binder components $B_2$) and $B_3$) and, if present, C) from the molding by a solvent in which component $B_1$) is insoluble,
3b) removing the solvent from the molding by drying,
3c) subsequent acid-catalyzed at least partial debinding of component $B_1$) and residual amounts of component $B_2$) from the molding, and
3d) optional thermal debinding at 200-600° C. of any residual amounts of components $B_1$), $B_2$), $B_3$) and/or C) still present.

* * * * *